US007316607B2

(12) United States Patent
Gauselmann

(10) Patent No.: US 7,316,607 B2
(45) Date of Patent: Jan. 8, 2008

(54) GAMING MACHINE DETERMINING THE RESULT OF A GAME IN TWO STAGES

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 733 days.

(21) Appl. No.: 10/225,705

(22) Filed: Aug. 21, 2002

(65) Prior Publication Data

US 2003/0050108 A1 Mar. 13, 2003

(30) Foreign Application Priority Data

Sep. 7, 2001 (DE) ................................ 101 43 864

(51) Int. Cl.
*G06F 17/00* (2006.01)
*G06F 19/00* (2006.01)

(52) U.S. Cl. ............................ 463/13; 463/12; 463/16; 463/17; 463/18; 463/19; 463/20; 463/25; 463/29; 273/138.1

(58) Field of Classification Search ............. 463/16–20
See application file for complete search history.

(56) References Cited

U.S. PATENT DOCUMENTS

| | | | | |
|---|---|---|---|---|
| 5,332,219 | A * | 7/1994 | Marnell et al. | 463/13 |
| 5,591,081 | A * | 1/1997 | Suzuki | 463/13 |
| 5,803,809 | A * | 9/1998 | Yoseloff | 463/13 |
| 5,833,536 | A * | 11/1998 | Davids et al. | 463/11 |
| 5,971,849 | A * | 10/1999 | Falciglia | 463/16 |
| 5,989,122 | A * | 11/1999 | Roblejo | 463/22 |
| 6,102,798 | A * | 8/2000 | Bennett | 463/16 |
| 6,261,178 | B1 * | 7/2001 | Bennett | 463/20 |
| 6,309,300 | B1 * | 10/2001 | Glavich | 463/26 |
| 6,371,851 | B1 * | 4/2002 | Singer et al. | 463/13 |
| 6,572,473 | B1 * | 6/2003 | Baerlocher | 463/20 |
| 6,609,972 | B2 * | 8/2003 | Seelig et al. | 463/16 |
| 2001/0023199 | A1 * | 9/2001 | Walker et al. | 463/13 |

FOREIGN PATENT DOCUMENTS

DE 3820865 A1 * 12/1989

OTHER PUBLICATIONS

Machine Translation of DE 38 20 865 A1, Gauselmann, Dec. 28, 1989.*
CYCLONE: Owns and Service Manual [Cyclone Arcade Game Released Jan. 1995].*
"ICE: Growing Like an Oak" [History of the ICE arcade game company], 1983-Present.*
Patent Abstract of German Patent No. DE 3820865 A, 1 page.

* cited by examiner

*Primary Examiner*—Xuan M. Thai
*Assistant Examiner*—Milap Shah
(74) *Attorney, Agent, or Firm*—Patent Law Group LLP; Brian D. Ogonowsky

(57) ABSTRACT

A plurality of symbols are randomly selected by a computer in the gaming machine and displayed to the player in the first stage of the process. One or more of the symbols are then selected by the gaming machine in the second stage of the process. An award to the player is based on the one or more selected symbols after the second stage. Such a two-stage process creates additional excitement since the player, after the first stage, hopes for the highest value symbol(s) to be selected in the second stage.

1 Claim, 4 Drawing Sheets

GAMING MACHINE DETERMINING THE RESULT OF A GAME IN TWO STAGES

FIELD OF INVENTION

This invention relates to a method of determining the result of a game of chance in a gaming machine and to a device to perform the method.

BACKGROUND

From the German application 38 20 865 C2, an amusement machine is known that displays a fixed number of symbols, for example, playing card symbols. Each symbol is displayed by a separate flip-card unit, which flips through a sequence of playing cards and stops on a selected card. A player control button is associated with each flip-card unit, and the player presses each button in an attempt to stop the flip-cards to obtain a winning combination of symbols. A computer in the gaming machine determines if the displayed combination is a winning combination in order to provide an award to the player.

It is desirable to improve on gaming machines, such as the one described above, to increase the player's excitement when playing the machines.

SUMMARY

It is the purpose of the present invention to select one or more symbols in a gaming machine so as to increase the player's satisfaction and increase the tension of the game. A plurality of symbols are randomly selected by a computer in the gaming machine and displayed to the player in a first stage of the process. One or more of the symbols are then automatically selected by the gaming machine in a second stage of the process.

In another embodiment, the player can actively participate in the game by pressing one or more buttons to control the gaming machine to select desired symbols in the first or second stage. However, in such a player-controlled embodiment, there is still some randomness introduced after the player presses a button.

Accordingly, the game operates in two stages: the selection and display of a plurality of symbols, followed by the selection of a subset of the symbols on which an award is based. Such a two-stage process creates additional excitement since the player, after the first stage, hopes for the highest value symbol(s) to be selected in the second stage.

DETAILED DESCRIPTION

Figure 1:
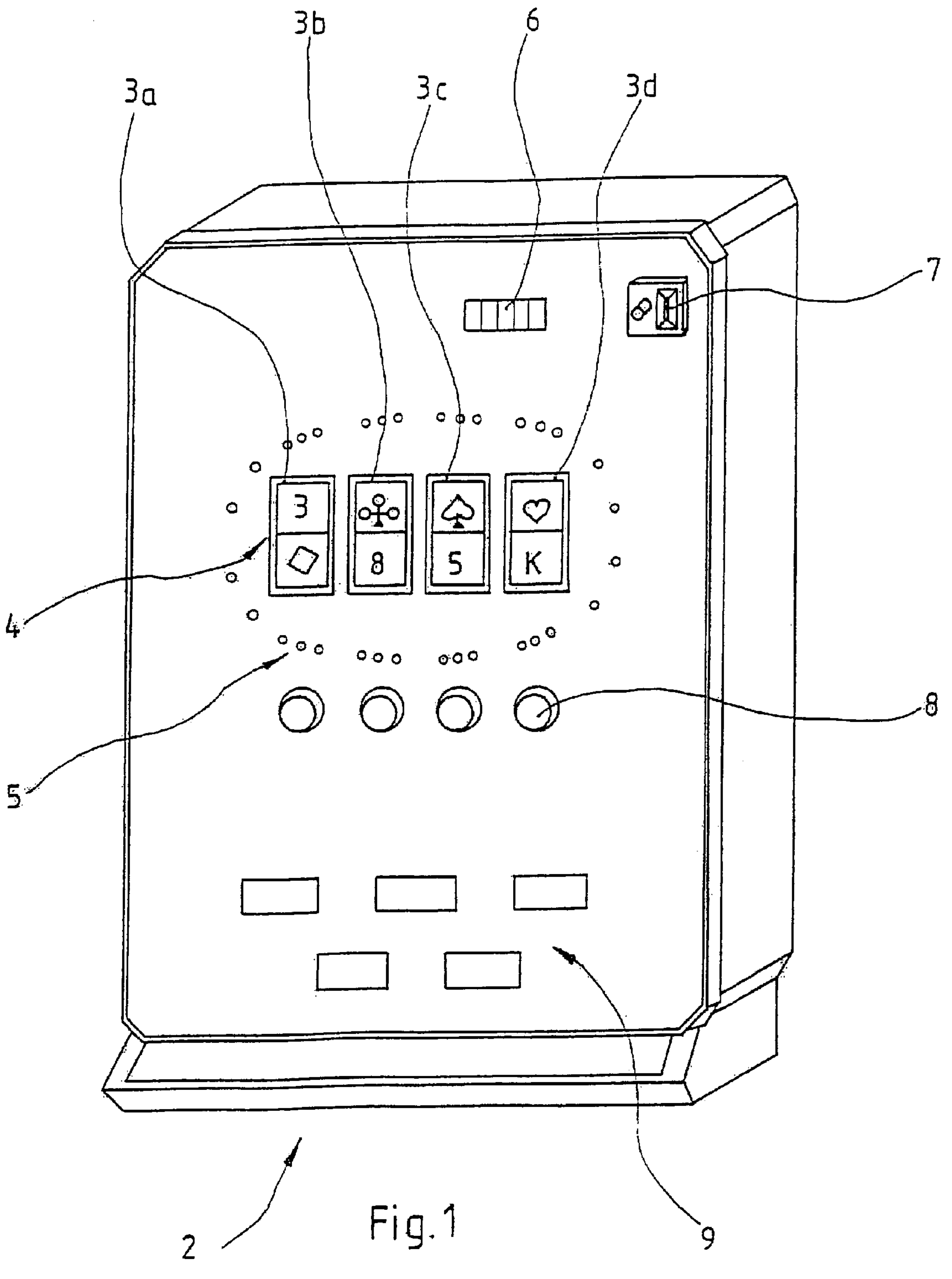
FIG. 1 is a perspective view of a gaming machine displaying symbols, where the display is surrounded by a symbol selector, such as lights.

FIG. 1 illustrates a gaming machine 2 having windows 3*a*-3*d* for revealing symbols generated by a symbol display device 4. In one embodiment, the symbol display device 4 comprises four flip-card units, such as described in German application P 35 00 946 C2. Each flip-card unit has symbols printed on flip-cards, where a motor rotates the flip-cards in sequence and stops the rotation to display a flip-card. In the embodiment of FIG. 1, in each of the windows 3*a*-3*d*, top and bottom flip-cards are used to display two symbols. The two symbols may be a playing card along with its suit. Such flip-card units may be conventional.

The symbol display device 4 has positioned around it a second display device 5. The second display device 5 is used to select a subset of the symbols displayed by the flip-cards as the final symbol(s) on which an award is based. In one embodiment, the second display device 5 comprises a plurality of transparent display fields (shown as circles) with a light behind each field. Alternatively, each field may be a separate light-emitting diode (LED).

At the top of the gaming machine 2 is a digital display 6, which displays the credits of a credit counter. Display 6 is connected to a control unit within the gaming machine 2 that keeps track of the credits and conducts the game. The control unit comprises a microcontroller (e.g. a microprocessor).

Adjacent to the display 6 is a coin slot 7. Any other form of monetary payment may also be accepted, such as magnetic strip cards, smart cards, bills, or paper tickets.

Below the symbol display device 4 are control elements 8, which can be buttons or touch-sensitive sensors. These control elements 8 are connected to the control unit. A player pressing a control element 8 provides a signal to the control unit for stopping the sequencing of symbols by the flip-cards. An element of randomness is incorporated into the game so that the player cannot easily control the final display. For example, the flipping of the cards may be so fast that the player is not able to predict the final symbol by pressing one of the control elements 8.

Below the control elements is a pay-table display 9, which identifies the awards for various symbols and/or symbol combinations. Symbols of, for example, 52 playing cards can be shown on the flip-card units, and the winning combinations may be certain types of poker hands or certain cards. Other types of indicia displayed may include money, credits, or award multipliers. The indicia displayed can be a combination of different types of indicia, such as playing cards and credit values.

The control unit comprises a pseudo-random number generator (formed by firmware or software) that pseudo-randomly selects a symbol out of all available symbols that can be displayed on a flip-card unit. The selection of this symbol is then used by the drive motor control unit of the respective flip-card unit to stop the rotation of the drive motor to display the selected symbol in one of the display windows 3*a*-3*d*. Techniques for stopping flip-cards to reveal a selected symbol are known. This procedure is performed for all flip-card units.

After all symbols are displayed in the first stage of the game, the control unit then determines which of the displayed symbols will be selected as the final symbol for determining the award to be granted to the player. The control unit activates the second display device 5 such that lights in the second display device 5 light in sequence around the symbol display device 4. The lights may blink randomly or in a clockwise or counter-clockwise direction. The control unit activates the second display device 5 and then stops the sequencing after a predetermined time. The selected symbol is identified by the position of the final illuminated field of the second display device 5. The symbol that is closest to the illuminated field is thus selected as the final symbol.

In one embodiment, only one light in the second display device 5 is illuminated after the second stage to select the symbol closest to that light as the final symbol upon which an award is based. In another embodiment, multiple lights in the second display device 5 identify multiple symbols forming a combination of symbols upon which the award is based. In yet another embodiment, it is random whether one or multiple symbols are selected. In another embodiment, symbols are "collected" in multiple games to obtain certain winning combinations, such that the player has incentive to keep playing the game to make use of the collected symbols.

The second display device 5 may take any form. In one embodiment, the selected symbols are highlighted by backlighting or front lighting or, if video, by changing the appearance of the selected symbols.

The player pressing one of the control elements 8 effectively ceases the driving signals to the drive motor or otherwise shortens the play time, giving the player a feeling of control over the game.

Accordingly, the game is performed in two stages, where a first stage randomly selects a subset of all the possible symbols (or other types of outcomes) of the game, and a second stage identifies one or more of the displayed symbols (or outcomes) upon which an award is based. Hence, the player becomes excited by the possibility of a very high award after the first stage and then experiences the tension as the second display device 5 selects a subset of the possible outcomes.

Typically, the value of the award (shown in pay-table 9) is chosen based upon the probability of the symbol or symbol combination being selected. The award may be credits, coins, or anything else. The pseudo-random number generator may be weighted to favor the selection of certain symbols over others in the flip-card display and to favor the selection of a subset of symbols by the second display means 5.

Figure 2:
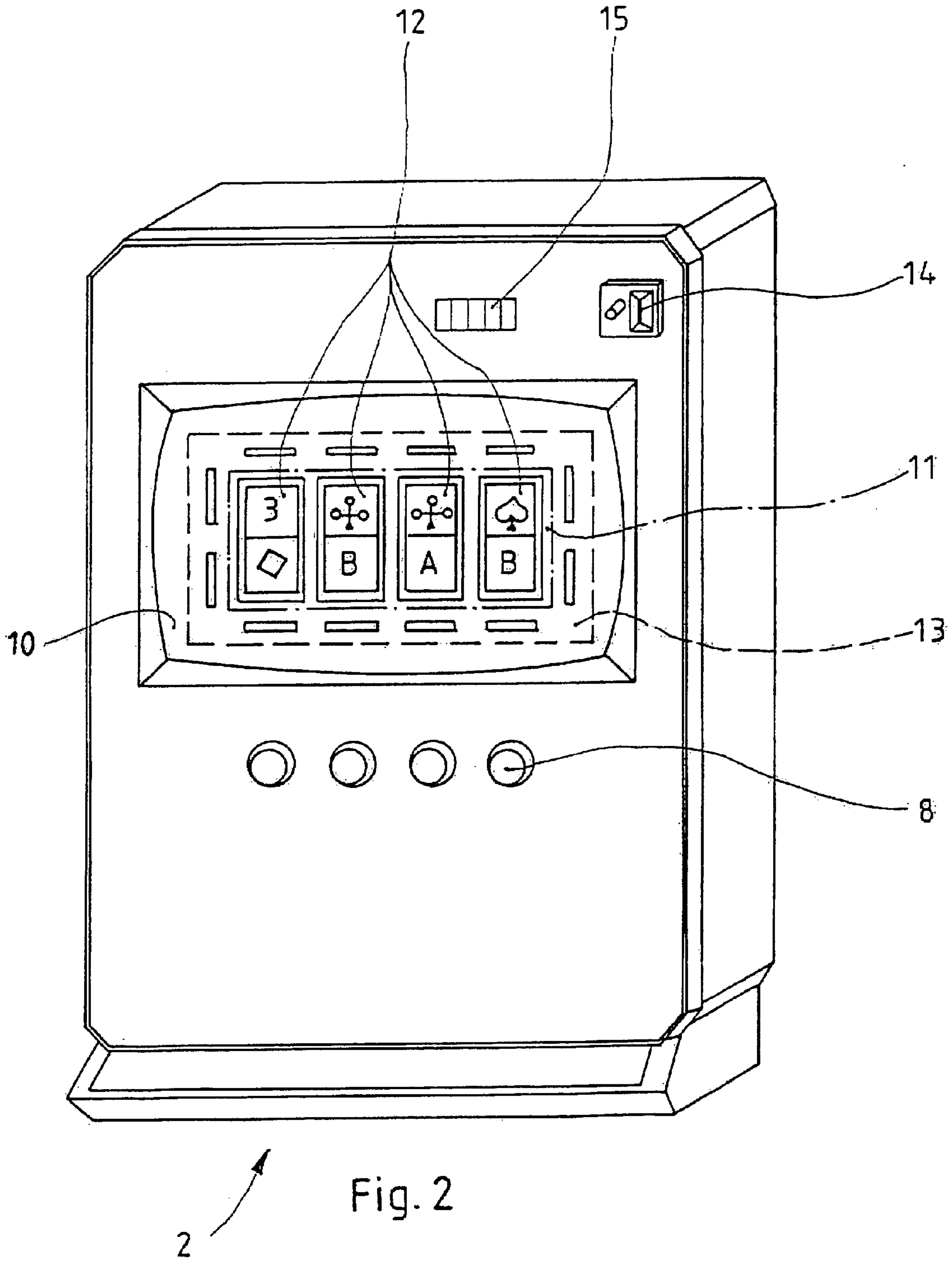
FIG. 2 is a perspective view of a gaming machine using a CRT or other type of video screen for displaying the symbols and the selector.

FIG. 2 shows the gaming machine 2 of FIG. 1 but with the mechanical display replaced with a CRT 10 or other type of video screen. Four symbols 12 are randomly selected by the control unit and displayed in a first display field 11 of CRT 10. The first display field 11 is surrounded by a second display field 13. The second display field 13 comprises peripheral areas of the CRT 10 that simulate light bars around the first display field 11. The areas in field 13 are activated (e.g., made brighter) by the control unit in a way that simulates either random control of the light bars or the sequencing of the light bars in a clockwise or counter-clockwise manner.

Below CRT 10 are control elements 8 associated with each symbol 12. As with FIG. 1, a player activating a control element 8 ceases the sequencing of the symbols. This gives the player a feeling of control over the symbol outcome. If the display is a touch screen, the control elements 8 are areas of the screen. As with FIG. 1, the stoppage of the sequencing of the light bars causes one or more of the light bars to remain illuminated to thus select one or more of the symbols 12 upon which an award is based.

Instead of the light bars or lights forming the second stage of a symbol display process, any other means may be used to identify one or more of the symbols selected in the first stage. The award may be based upon a single symbol, a combination of symbols after a single game, or a combination of symbols collected after multiple games. A further display may show the accumulated symbols.

A coin input slot 14 accepts coins for a coin validator. The coin validator then transmits a signal corresponding to the coin value to the control unit to increment the credit counter display 15. The credit counter display 15 can also be a display field of the CRT 10. Other forms of money can be accepted as described above.

In another embodiment, the display of symbols may be by four endless tapes or reel strips which rotate through the display window. Any other techniques for selecting and displaying symbols may also be used, such as wheels.

The described game may be the main game in a gaming machine or a bonus game in the machine. The gaming machine may be a stand alone type or connected to a central server via a network.

Figure 3:
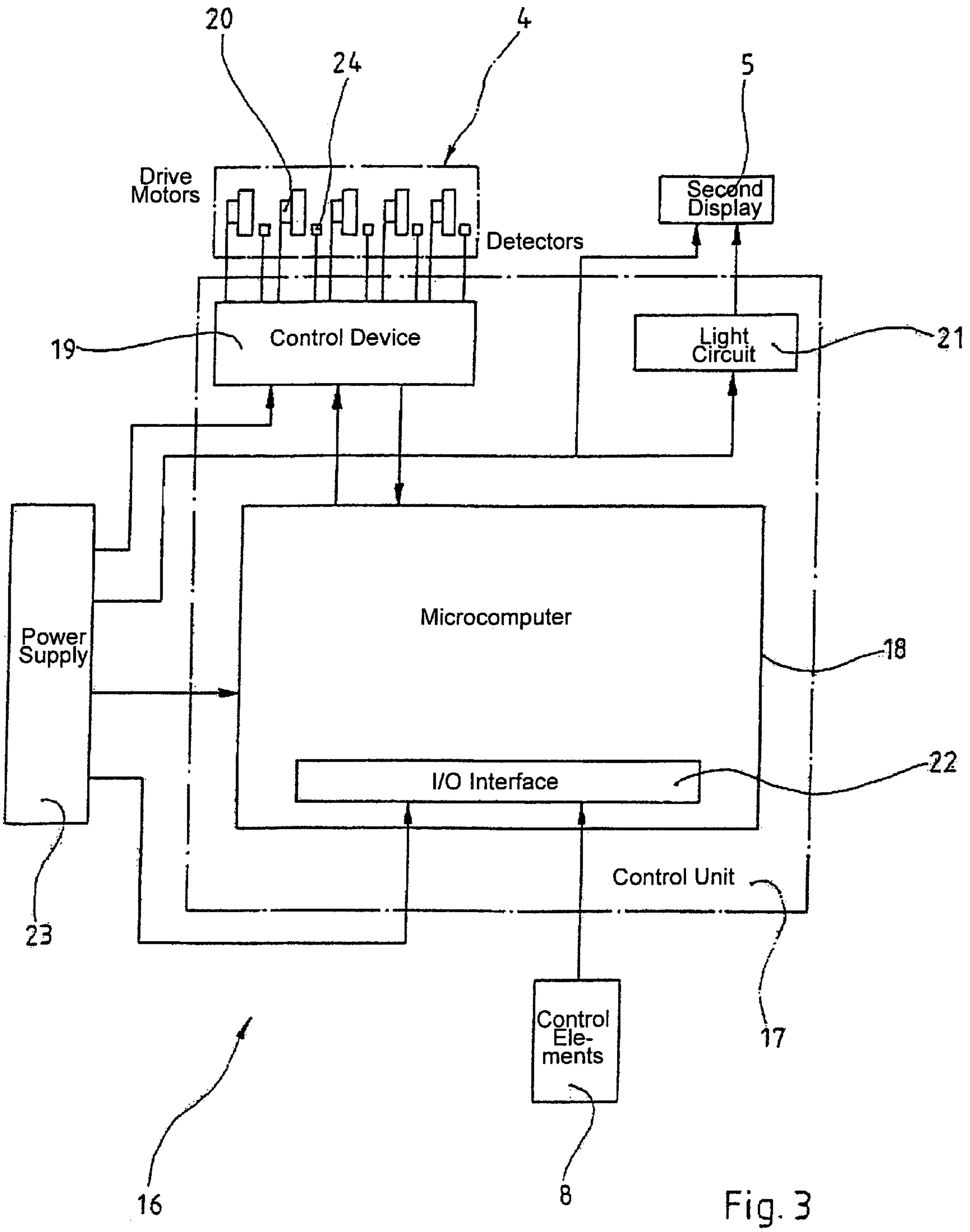
FIG. 3 is a functional block diagram of the gaming machine of FIG. 1 or FIG. 2.

FIG. 3 is a block diagram 16 of the gaming device of FIG. 1. A control unit 17 comprises a microcomputer 18, a control device 19 for the drive motors 20 of the flip-card units, and a circuit 21 to activate the lights (e.g., LEDs) of the second display means 5 in FIG. 1. A control unit 17 for the CRT version of FIG. 2 would not include the control device 19 and circuit 21. The microcomputer 18 comprises a pseudo-random number generator and an input/output interface 22 for peripheral devices such as control elements 8, the drive motors, the LEDs, the coin validator, and any other devices.

Detectors 24, connected to the drive motor control device 19, identify the positions of the drive motors and provide a feedback signal to the control device 19 to stop the flip-card units when the preselected symbols are displayed.

A power supply 23 provides the power for the gaming machine 2. A transformer within the power supply 23 provides the rectified voltages for the different elements of the gaming machine.

Figure 4:
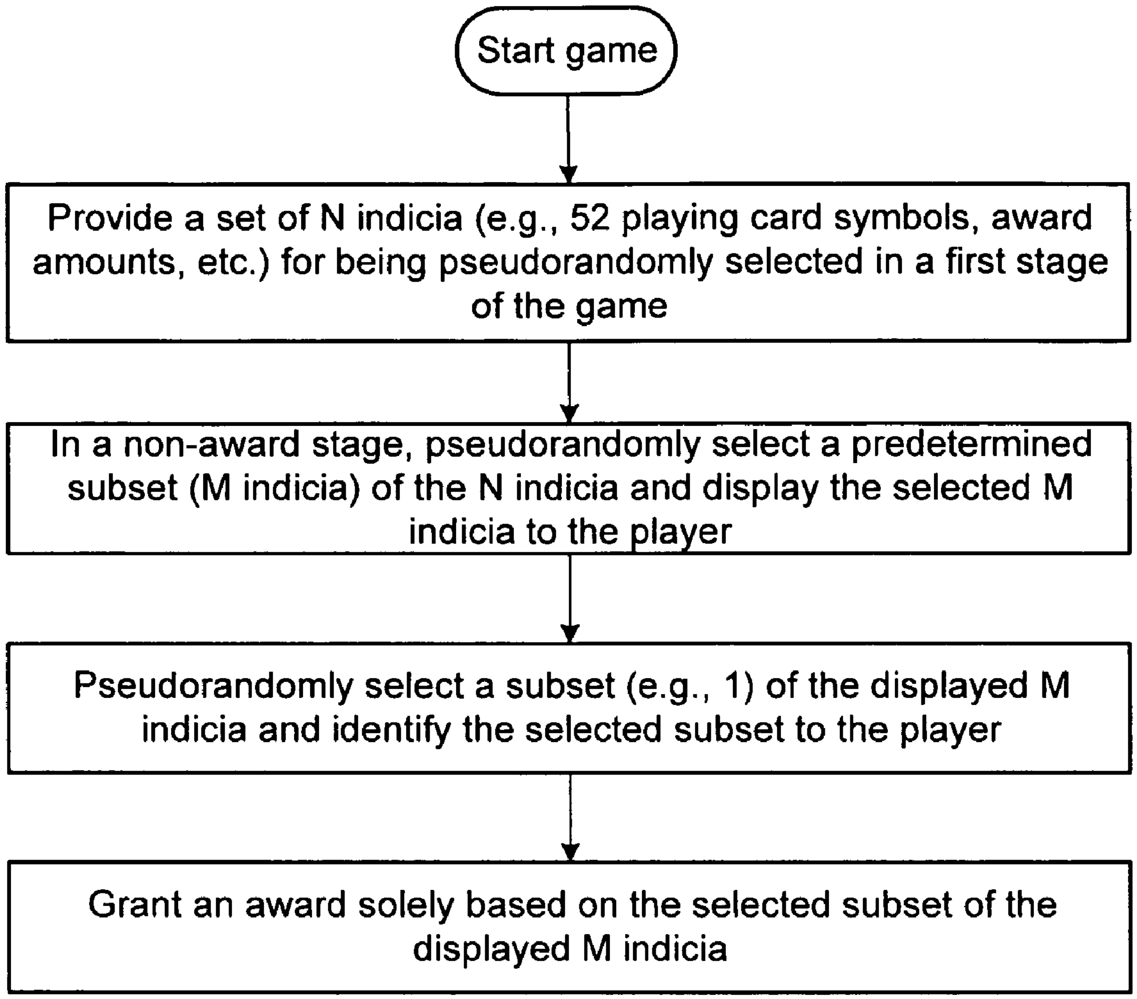
FIG. 4 is a flowchart showing various steps of a process in accordance with one embodiment of the invention.

FIG. 4 is a self-explanatory flowchart showing various steps of the previously described process in accordance with one embodiment of the invention.

While particular embodiments of the present invention have been shown and described, it will be obvious to those skilled in the art that changes and modifications may be made without departing from this invention in its broader aspects and, therefore, the appended claim are to encompass within their scope all such changes and modifications as fall within the true spirit and scope of this invention.

What is claimed is:

1. A gaming method for conducting a game comprising:

selecting a plurality of M indicia from a set of N indicia, where N is greater than M, the M indicia not directly corresponding to a value;

after selecting the plurality of M indicia, displaying the M indicia to a player in a non-award stage of the game;

after displaying the M indicia, pseudorandomly selecting only a subset of the M indicia; and collecting the selected subset of the M indicia over multiple games to obtain winning combinations of indicia, wherein predetermined winning combinations of collected indicia provide an award to the player.

* * * * *